United States Patent Office 3,646,124
Patented Feb. 29, 1972

3,646,124
PROCESS FOR PURIFICATION OF TEREPHTHALIC ACID OR ITS SALT
Willis C. Keith, Glenwood, and Carl E. Johnson, Matteson, Ill., assignors to Atlantic Richfield Company, New York, N.Y.
No Drawing. Filed Jan. 23, 1969, Ser. No. 793,603
Int. Cl. C07c 51/48
U.S. Cl. 260—525    14 Claims

ABSTRACT OF THE DISCLOSURE

An extraction process for the removal of impurities from terephthalic acid is disclosed. In this process an aqueous solution of a salt of terephthalic acid, for instance containing greater than about 1 weight percent of the salt, is extracted with n-butanol or benzyl alcohol at about 0 to 150° C., and the resulting phases separated to give an aqueous salt solution of increased purity. The terephthalic acid can be precipitated from solution by acidification. The alcohol to salt solution volume ratio in the extraction may often vary from about 1:5 to 15:1.

---

The present invention is directed to the removal of impurities from terephthalic acid. More particularly, the invention is concerned with the removal from terephthalic acid of intermediate products formed during the oxidation of para-xylene to terephthalic acid. This process has been found to be useful in the purification of terepthalic acid to produce a fiber grade product by selectively removing impurities such a para-toluic acid and 4-carboxy benzaldehyde.

Terephthalic acid, when use in the preparation of polymers, such as linear polyethylene terephthalate, must be exceptionally free of impurities which are colored or give rise to color in the reaction products, or act as chain terminators, or otherwise yield low quality polymers. These limitations are due to the use of the polymer in products such as films or fibers. The impurities, although not completely identified are believed to be intermediates formed during the oxidation of p-xylene to terephthalic acid (hereinafter called TPA). Since the physical properties of these impurities and TPA are quite similar, TPA of high purity is quite difficult to produce.

Processes such as crystallization and distillation have not been entirely satisfactory in removing impurities from TPA. Purification by crystallization is often unsuitable since small amounts of monobasic acid can co-crystallize with the TPA, and distillation is not adequate since the volatility of the acids is too low to permit their separation by distillation without degradation of TPA.

It has now been found that impurities such as para-toluic acid (p-TA) and 4-carboxybenzaldehyde (4-CBA) can be effectively removed from crude TPA by single or multiple extraction with n-butanol or benzyl alcohol. More specifically, when an aqueous solution of a salt of TPA produced by oxidation of p-xylene, is contacted and extracted with n-butanol or benzyl alcohol, the impurities are dissolved in the alcohol and the aqueous salt solution remains immiscible with the alcohol to facilitate separation of these phases. The aqueous phase can be acidified to produce a TPA product which is purer than the crude form. If desired, the purer salt could be obtained as such from the aqueous phase.

In the process of the present invention the crude or impure terephthalic acid containing impurities, such as p-TA and 4-CBA, is in an aqueous solution as an ammonium, alkali metal or amine salt, preferably as the ammonium salt. The salt form of the impure terephthalic acid can be obtained from the oxidation system, or a crude terephthalic acid reaction product can be mixed with a base of the salt-forming cation to give the salt solution. When amines are used to form the salts, the amine should be water-soluble and capable of forming water-soluble salts with TPA. Among the suitable amines are the lower alkyl amines and the cyclic amines, such as pyridine. The amount of TPA salt in the solution is sufficient to make its purification worthwhile and often the salt is in at least about 1 weight percent concentration and can be present in amounts up to the limit of solubility under the conditions utilized. Preferably, the salt is present in amounts of from about 5 to 20 weight perecnt based on the water present.

In the liquid-liquid extraction, the TPA salt solution is contacted and thoroughly mixed with the n-butanol or benzyl alcohol, frequently in an alcohol to solution volume ratio of about 1:5 to 15:1 or more, preferably about 1:1 to 5:1, at a temperature of from about 0 to 150° C., preferably about 20 to 100° C. In general, the greater the ratio of alcohol solvent to aqueous salt solution in the extraction, the greater the amount of impurities removed. After thorough mixing, for example by shaking or vigorous stirring the mixture to insure that the liquid-liquid extraction step is efficiently performed, the mixture is separated into two phases, e.g. by standing quiescently. The aqueous solution containing purified TPA salt can be withdrawn or otherwise separated from the organic phase. The process can be operated on a continuous basis by various extraction methods, e.g. continuous extraction in one vessel with withdrawal and separation of the aqueous and alcohol layers in another vessel. The extraction can also be carried out in a plurality of stages by extracting the aqueous salt solution with n-butanol or benzyl alcohol several times.

Acidication of the aqueous solution after the extraction serves to precipitate TPA. The separated aqueous solution can be acidified with a water-soluble acid which is more acidic than TPA, e.g. a lower carboxylic acid or a mineral acid such as sulfuric acid or hydrochloric acid to precipitate the product TPA. The addition of dilute acid solutions to acidify the salt solution is preferred so that the resulting slurry may be easily handled. Before acidification any n-butanol or benzyl alcohol in the aqueous phase can, if desired, be removed, e.g. by distillation.

The precipitated acid can be filtered from the acidified aqueous phase by conventional means, e.g. a rotary vacuum drum filter, washed with water and dried to produce a purified terephthalic acid product. The water wash can be accomplished in the filter or a reslurrying technique can be used. Dying can be effected at temperatures below that which would cause degradation, such as coloring, for example at up to about 100° C. in either a continuous or batch system, e.g. with a moving belt dryer, or in ovens.

The present invention will be illustrates by the following examples.

EXAMPLE I 100 cc. of an aqueous solution of 9.64 weight percent diammonium terephthalate (8 weight percent TPA obtained as a crude reaction product by the liquid phase, air oxidation of p-xylene using a cobalt catalyst) was shaken for five minutes with 100 cc. of n-butanol in a separatory funnel. After allowing the materials to separate, the aqueous layer containing the purified diammonium terephthalate was added dropwise to 615 gms. of 0.935 weight percent sulfuric acid. The large volume of acid solution was used to facilitate handling of the thick slurry of terephthalic acid that formed. The acid product was vacuum filtered and washed with 100 cc. of distilled water before drying. 7.50 gms. of acid containing 0.79% reducibles were recovered as compared with 7.97 gms. of acid recovered from an unextracted solution that contained 1.08% reducibles, or a 26.9% reduction in reducibles was obtained in a single extraction with n-butanol.

EXAMPLE II

Sixteen extractions were performed according to the procedure of Example I at temperatures from 25 to 75° C., the differing temperatures served to compare the effects of various solvents. The results are shown in the table below. 5 weight percent of crude terephthalic acid (TPA) obtained by the liquid phase air oxidation of p-xylene, was dissolved in aqueous ammonium hydroxide at a pH of 7–8. The solution contained 1.0 weight percent para toluic acid (p-TA) and 0.9 weight percent 4-carboxybenzaldehyde (4-CBA) as noted opposite Feed in the table. A solvent to aqueous salt solution volume ratio of 1:2 and an extraction time of 15 minutes were utilized and the aqueous salt solution was acidified after separation to recover the TPA in good yield. Gas chromatographic analysis was used to determine the amounts of p-TA and 4-CBA remaining in the purified product. n-Butanol and benzyl alcohol were substantially more effective extractants when compared to the other solvents as can be seen by the data of Table I. n-Butanol removed from 51 to 59% of the p-TA and from 30 to 50% of the 4-CBA depending on the temperature utilized. Benzyl alcohol and sec-butanol were the closest in effectiveness to n-butanol, the former removing 48% of the p-TA and 45.6% of the 4-CBA and the latter 36% of the p-TA and 32% of the 4-CBA, respectively, at 25° C. At this temperature n-butanol extracted 59% of the p-TA and 50% of the 4-CBA, substantially better than sec-butanol. Benzyl alcohol was likewise better than sec-butanol.

TABLE I.—IMPURITY REMOVAL BY EXTRACTION OF AQUEOUS DIAMMONIUM TEREPHTHALATE

| Test No. | Solvent | Temp. (° C.) | Product analysis (wt. percent) | |
|---|---|---|---|---|
| | | | p-TA | 4-CBA |
| | Feed | | 1.0 | 0.9 |
| 1 | Trichloro methane | 25 | .88 | .78 |
| 2 | do | 50 | .87 | .95 |
| 3 | Trichloro methane [1] | 25 | .89 | .75 |
| 4 | Trichloro methane [2] | 25 | .79 | .73 |
| 5 | 2-octanol | 25 | .84 | .58 |
| 6 | Benzyl alcohol | 25 | .52 | .49 |
| 7 | 2-hetyl hexanol | 25 | .77 | .77 |
| 8 | Sec-butanol | 25 | .64 | .61 |
| 9 | Carbon tetrachloride | 25 | .78 | .67 |
| 10 | Diethyl ether | 25 | .72 | .77 |
| 11 | Benzene [1] | 25 | .75 | .73 |
| 12 | Benzene [2] | 25 | .87 | .71 |
| 13 | do | 50 | .87 | .87 |
| 14 | n-Butanol | 25 | .41 | .45 |
| 15 | do | 50 | .48 | .63 |
| 16 | do | 75 | .49 | .62 |

[1] TPA precipitated in mixed solvent system.
[2] Four extractions.

EXAMPLE III

Extraction of an aqueous ammonia solution of crude terephthalic acid with n-butanol was further tested. Solvent ratio was varied, and consecutive batch extractions were carried out as summarized in Table II. Clearly, removal of p-toluic acid is improved by increasing the quantity of extraction solvent. The same is true for 4-carboxybenzaldehyde. Also, the separation efficiency, as indicated by percent impurity removal is constant. Successive extractions can be made to meet fiber grade specifications for p-toluic acid, and for adequate removal of 4-carboxybenzaldehyde.

TABLE II.—IMPURITY REMOVAL BY EXTRACTION OF AQUEOUS (NH₄)₂ TPA WITH n-BUTANOL

| Test No. | n-Butanol/ salt soln. ratio (vol.) | Number of extractions | Product analyses (wt. percent) | | Wt. percent removal | |
|---|---|---|---|---|---|---|
| | | | p-TA | 4-CBA | p-TA | p-CBA |
| 1 | 1/2 | 1 | 0.41 | 0.45 | 59 | 50 |
| 2 | 1/1 | 1 | 0.32 | 0.49 | 68 | 46 |
| 3 | 2/1 | 1 | 0.21 | 0.34 | 79 | 62 |
| 4 | 2/1 | 2 | 0.033 | 0.11 | 84 | 68 |
| 5 | 2/1 | 3 | 0.0073 | 0.037 | 78 | 66 |

It is claimed:
1. A process for the purification of terephthalic acid or its salt obtained by oxidation of p-xylene and containing impurities resulting from said oxidation, which comprises extracting an aqueous salt solution of said terephthalic acid, said salt being an alkali metal, ammonium or water-soluble amine salt, with an alcohol selected from the group consisting of n-butanol and benzyl alcohol, and separating resulting organic and aqueous phases.

2. The process of claim 1 wherein the extraction is at a temperature of about 20 to 100° C.

3. The process of claim 2 wherein the alcohol-solution volume ratio is from about 1:1 to 5:1.

4. The process of claim 1 wherein the salt is diammonium terephthalate.

5. The process of claim 3 wherein said aqueous salt solution contains about 5 to 20 wt. percent terephthalic acid salt based on the water present.

6. The process of claim 5 wherein the salt is diammonium terephthalate.

7. The process of claim 1 wherein the alcohol is n-butanol.

8. The process of claim 1 wherein the alcohol is benzyl alcohol.

9. The process of claim 1 wherein after the extraction the aqueous phase is acidified with a water soluble acid to precipitate a purified terephthalic acid product.

10. The process of claim 9 wherein the water-soluble acid is a mineral acid.

11. The process of claim 10 wherein the water-soluble acid is sulfuric acid.

12. The process of claim 9 wherein the aqueous salt solution is extracted at a temperature of about 25 to 100° C., with an alcohol-solution volume ratio of from about 1:1 to 5:1.

13. The process of claim 12 wherein the aqueous salt solution is from about 5 to 20 weight percent terephthalic acid salt based on the water present.

14. The process of claim 13 wherein the salt is diammonium terephthalate.

References Cited

UNITED STATES PATENTS 3,243,456  3/1966  Coldwell et al. _____ 260—525

FOREIGN PATENTS 1,195,140  11/1959  France _____ 260—525

OTHER REFERENCES

Vogel, "Practical Organic Chemistry," 3rd edition, 1955, page 149.

LORRAINE A. WEINBERGER, Primary Examiner
R. S. WEISSBERG, Assistant Examiner